(No Model.)
H. A. L. BARRY.
DRILL BRACE.
No. 504,147. Patented Aug. 29, 1893.
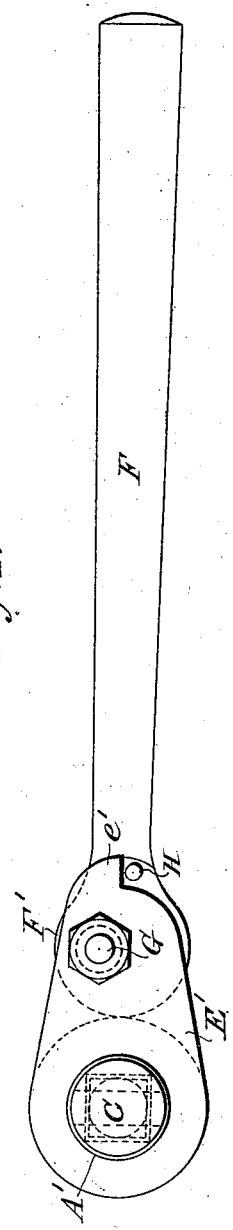
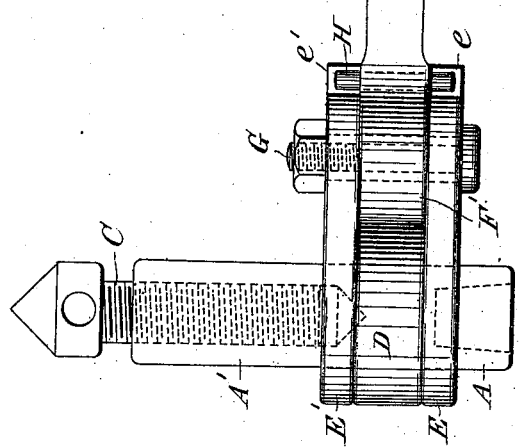
Witnesses:
Geo. W. Higham.
Frank Higham.
Inventor:
Herbert. A. L. Barry

UNITED STATES PATENT OFFICE.

HERBERT ALFRED LUCAS BARRY, OF LONDON, ENGLAND.

DRILL-BRACE.

SPECIFICATION forming part of Letters Patent No. 504,147, dated August 29, 1893.

Application filed March 1, 1893. Serial No. 464,262. (No model.) Patented in England March 21, 1892, No. 5,518.

*To all whom it may concern:*

Be it known that I, HERBERT ALFRED LUCAS BARRY, a subject of the Queen of Great Britain and Ireland, residing at Stanley House, London Road, Forest Hill, London, in the county of Kent, England, have invented a certain new and useful Improved Drill-Brace, (in respect whereof I have obtained Letters Patent in Great Britain, No. 5,518, to bear date March 21, 1892,) of which the following is a specification.

This invention relates to an improved drill-brace; its objects being to simplify the construction, increase the efficiency and reduce the cost of manufacture.

In the accompanying drawings, Figure 1 is a side elevation and Fig. 2 a plan of a drill-brace constructed according to my improved method.

In carrying out my invention, I employ a hollow cylindrical body A A', one end A of which contains a socket (shown in dotted lines in Fig. 1) for the base of the removable drill. The center or pivot-pin C of the drill screws into the other end A' of the hollow cylindrical body; the independent rotation of this center or pivot-pin effecting the feed. A collar D is formed on or secured to the cylindrical body near the end A containing the socket; a flat link E slipped over the body lying on one side and a similar link E' on the other side of this collar. The hand-lever F F' is pivoted between the free ends of the two links E and E'; the boss F' of the hand-lever being in contact with the collar D. The pivot-pin or bolt G by means of which the lever is connected to the links is put through the boss eccentrically. It may be surrounded by a sleeve, as indicated in dotted lines. Near the circumference of the boss, a small pin H is driven through the lever F F'; the projecting ends of this pin engaging in one direction of motion with ears *e* and *e'* formed on the links.

The action of the parts is as follows: When the hand-lever F F' is moved for the purpose of actuating the drill, the boss F' of the lever turns to a slight extent on its pivot, and, being pivoted eccentrically between the links E and E', engages with the collar D on the cylindrical body A A'; the friction of the lever F F' and links E and E' on the collar D and body A A' being sufficient to communicate the movement of the lever to the body and consequently to the drill. The extent of travel of the hand-lever F F' having been reached, the hand-lever is turned back on its pivot into its normal position, whereupon the boss F' of the lever becomes disengaged from the collar D, and the projecting ends of the small pin H are brought into contact with the ears *e* and *e'* on the links E and E' and cause the links to rotate on the cylindrical body A A' until the direction of movement of the lever F F' is again changed; the boss F' of the lever thereupon immediately re-engaging with the collar D.

What I claim as my invention, and desire to secure by Letters Patent, is—

A drill-brace consisting of a holder A A' for the drill, a pivot-pin C screwing into the upper end of the holder, a collar D on the low part of the holder, a loose link E below the collar D, another loose link E' above that collar, a hand-lever F F' placed between the links E and E' and adapted to engage with the collar D, a bolt G serving to prevent the links E and E' slipping out of position, and a pin H driven through the lever F F' and engaging in one direction of rotation with ears *e* and *e'* on the links, as shown in the accompanying drawings.

HERBERT ALFRED LUCAS BARRY.

Witnesses:
   GEO. W. HIGHAM,
8 *Atterbury Road, Harringay, N.*
   FRANK HIGHAM,
102 *Wightman Road, Harringay, N.*